(12) United States Patent
Sultana et al.

(10) Patent No.: US 11,555,408 B2
(45) Date of Patent: Jan. 17, 2023

(54) DEVICE FOR ATTACHING BLADES IN A CONTRA-ROTATING TURBINE

(71) Applicant: Safran Aircraft Engines, Paris (FR)

(72) Inventors: Patrick Jean Laurent Sultana, Moissy-Cramayel (FR); Clément Charles Jérémy Coiffier, Moissy-Cramayel (FR); Olivier Renon, Moissy-Cramayel (FR); Laurent Cédric Zamai, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 17/593,793

(22) PCT Filed: Apr. 3, 2020

(86) PCT No.: PCT/EP2020/059506
§ 371 (c)(1),
(2) Date: Sep. 24, 2021

(87) PCT Pub. No.: WO2020/207909
PCT Pub. Date: Oct. 15, 2020

(65) Prior Publication Data
US 2022/0162951 A1 May 26, 2022

(30) Foreign Application Priority Data
Apr. 8, 2019 (FR) ...................... 1903741

(51) Int. Cl.
*F01D 5/32* (2006.01)
*F01D 5/26* (2006.01)
*F01D 5/30* (2006.01)

(52) U.S. Cl.
CPC ............... *F01D 5/326* (2013.01); *F01D 5/26* (2013.01); *F01D 5/3007* (2013.01);
(Continued)

(58) Field of Classification Search
CPC .......... F01D 5/326; F01D 5/26; F01D 5/3007; F01D 5/03; F01D 1/26; F01D 5/06;
(Continued)

(56) References Cited

U.S. PATENT DOCUMENTS 2,654,566 A * 10/1953 Boyd ...................... F01D 9/042
415/137
2,755,064 A * 7/1956 Simonsen ............... F01D 9/042
415/209.3
(Continued)

FOREIGN PATENT DOCUMENTS

FR 3039218 A1 1/2017

OTHER PUBLICATIONS

International Search Report issued in International application PCT/EP2020/059506 dated Jun. 3, 2020 (2 pages).
(Continued)

*Primary Examiner* — Brian P Wolcott
*Assistant Examiner* — Eric A Lange
(74) *Attorney, Agent, or Firm* — Bookoff McAndrews, PLLC

(57) ABSTRACT

Counter-rotating turbine (C) of a turbomachine (10) extending about an axis (X) and comprising an inner rotor configured to rotate about the axis of rotation (X), and comprising an inner drum on which an inner movable blading (22) is fixed, an outer rotor configured to rotate about the axis of rotation (X) in a direction opposite to the inner rotor, and comprising an outer drum (50) on which an outer movable blading (20) is fixed, the outer movable blading (20) comprising at least one fixing rod (212) extending through an orifice (51) of the outer drum (50), the outer movable blading (20) being fixed to the outer drum (50) via a clamping means (100) fixed to the fixing rod (212) from an outer face of the outer drum (50), a set ring (80) being
(Continued)

disposed around the fixing rod (50) in the orifice (51) of the outer drum (50).

9 Claims, 6 Drawing Sheets

(52) U.S. Cl.
CPC ...... *F05D 2230/60* (2013.01); *F05D 2260/31* (2013.01); *F05D 2260/96* (2013.01)

(58) Field of Classification Search
CPC . F01D 5/10; F01D 5/3023; F01D 5/32; F01D 25/06; F01D 5/30; F05D 2230/60; F05D 2260/31; F05D 2260/96; F02C 3/067; Y02T 50/60
See application file for complete search history.

(56) References Cited

U.S. PATENT DOCUMENTS

| | | | | |
|---|---|---|---|---|
| 5,307,622 | A * | 5/1994 | Ciokajlo | F02C 3/067 |
| | | | | 416/128 |
| 6,371,727 | B1 * | 4/2002 | Stangeland | F01D 5/225 |
| | | | | 416/190 |
| 2013/0336794 | A1 * | 12/2013 | Armstrong | F01D 9/00 |
| | | | | 416/189 |
| 2015/0226075 | A1 * | 8/2015 | Aoki | F01D 25/246 |
| | | | | 415/209.3 |

OTHER PUBLICATIONS

Search Report in French Application No. 1903741 dated Sep. 1, 2020 (2 pages).

\* cited by examiner

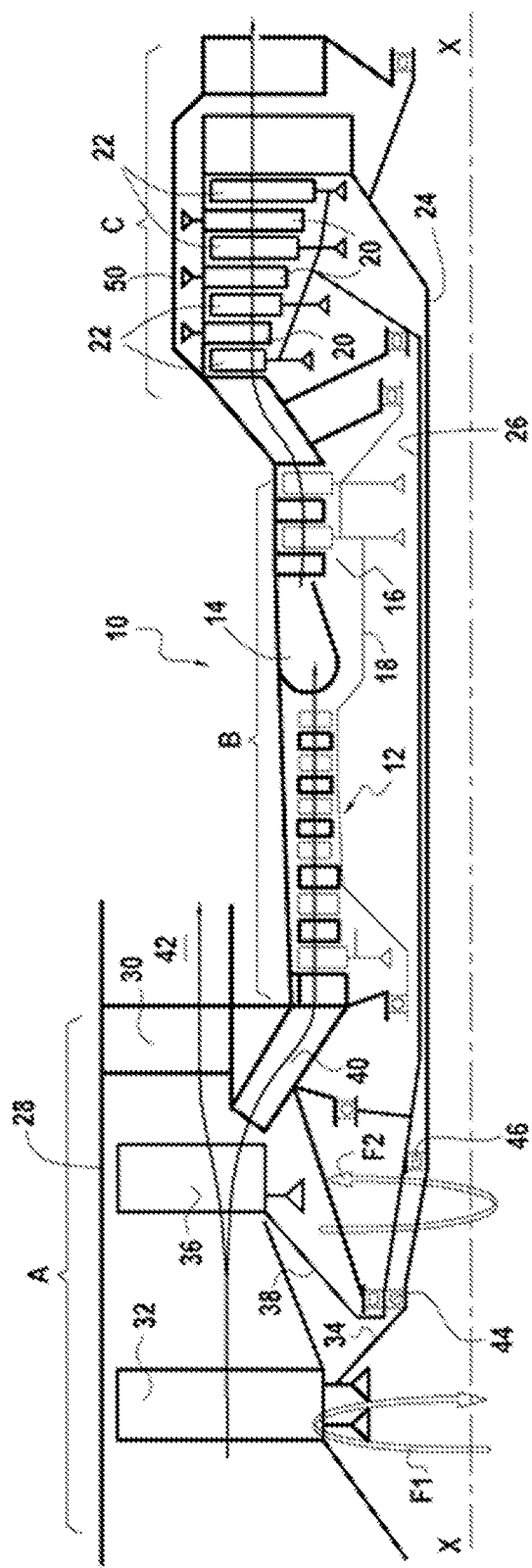
[Fig. 1]

[Fig. 2]
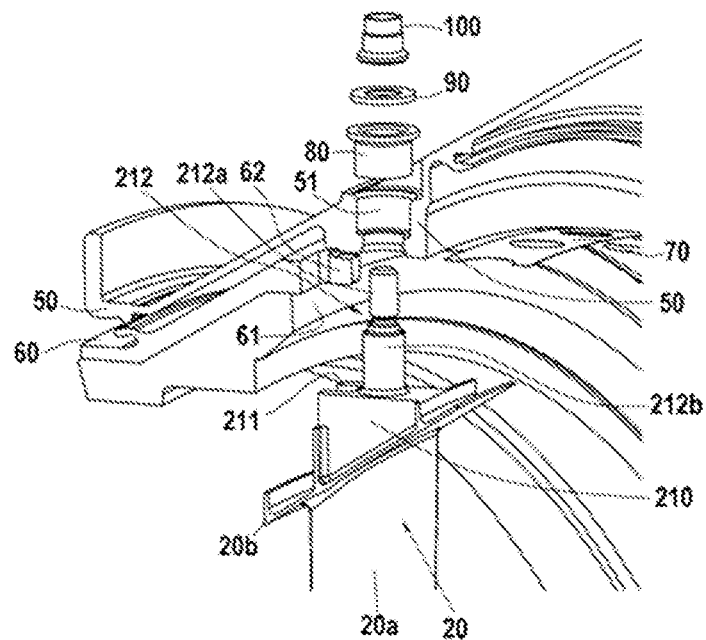
[Fig. 3]
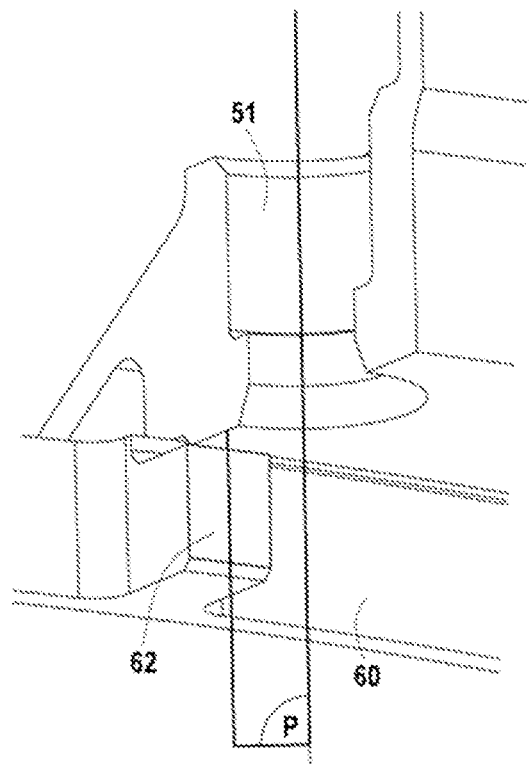

[Fig. 4]
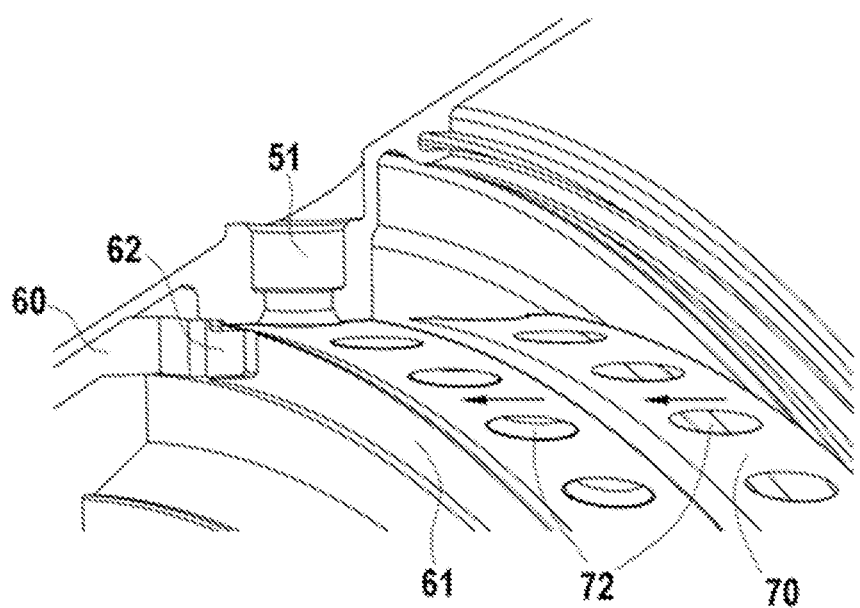
[Fig. 5A-5C]
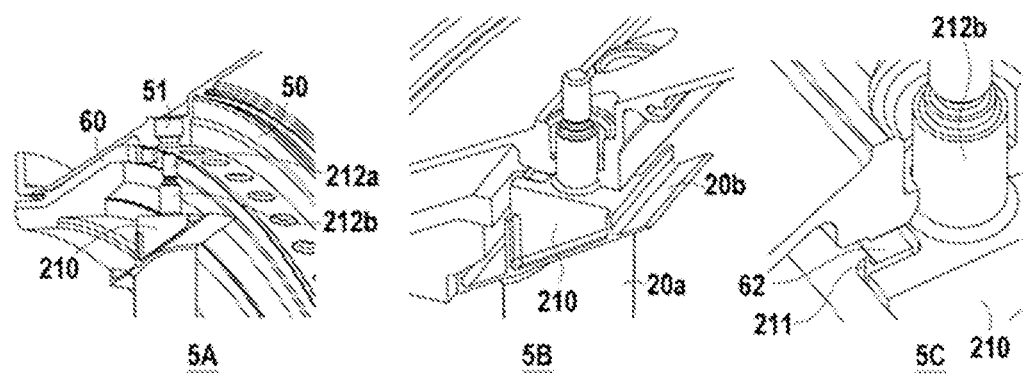

[Fig. 6A-6B]
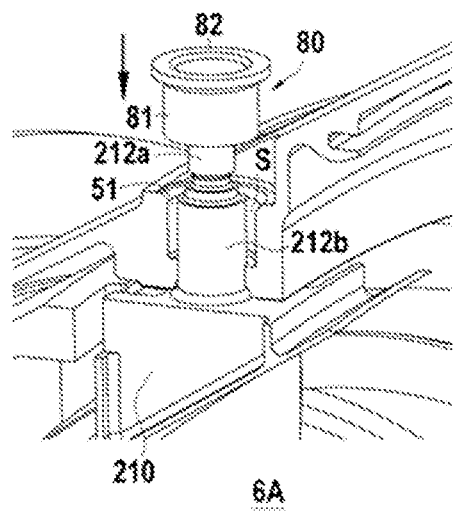
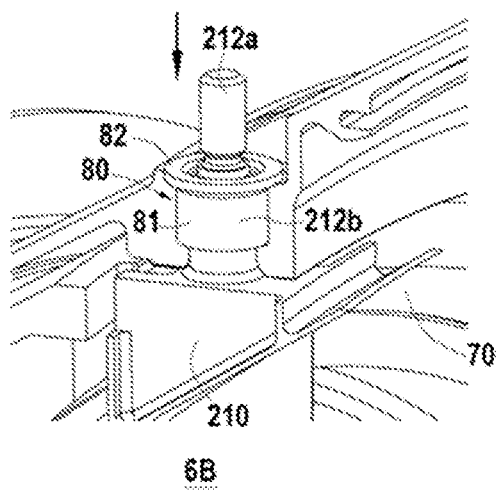
6A
6B
[Fig. 7A-7B]
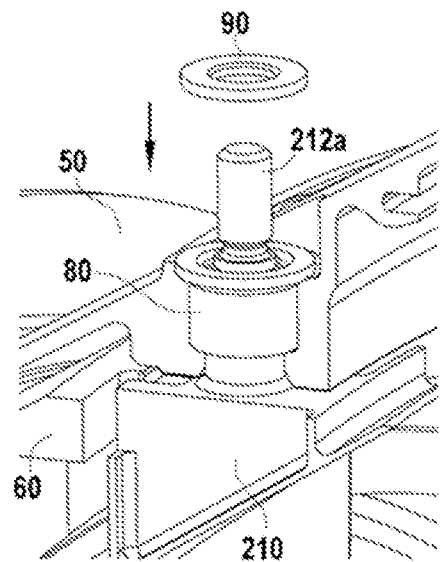
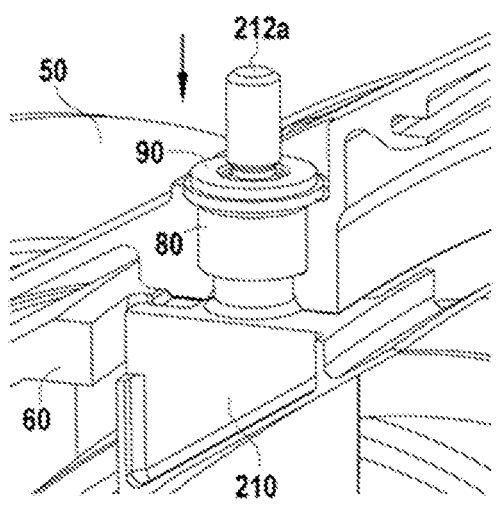
7A
7B

[Fig. 8A-8B]
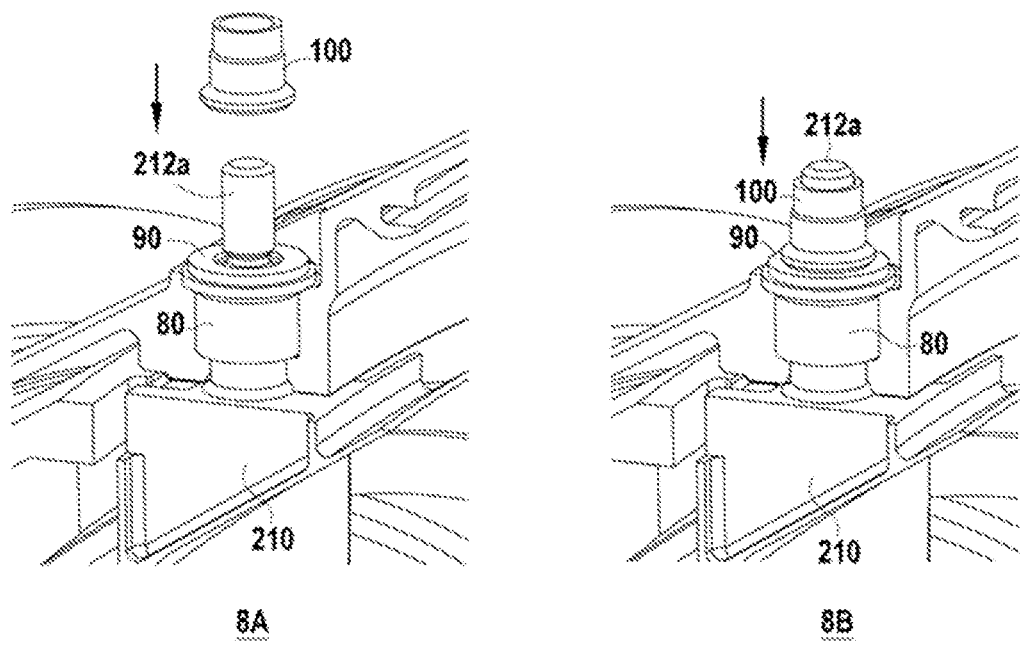
8A        8B
[Fig. 9]
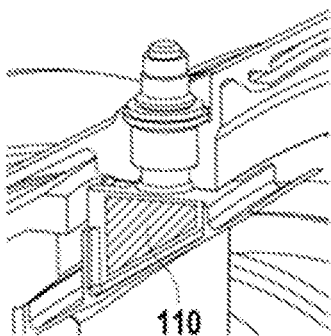

[Fig. 10A-10B]
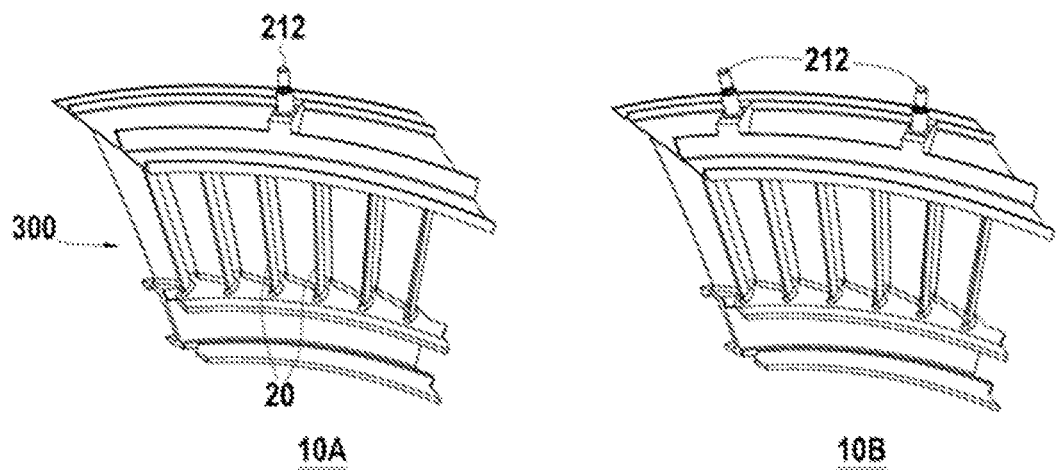
10A  10B
[Fig. 11]

DEVICE FOR ATTACHING BLADES IN A CONTRA-ROTATING TURBINE

CROSS-REFERENCE TO RELATED APPLICATION(S)

This application is the U.S. national phase entry of International Patent Application No. PCT/EP2020/059506, filed on Apr. 3, 2020, which claims priority to France Patent Application No. FR1903741, filed on Apr. 8, 2019.

TECHNICAL FIELD

The present disclosure relates to the field of turbomachines. More specifically, the present disclosure relates to the field of counter-rotating turbines of a turbomachine, and in particular a device for fixing rotor blades of such a turbine, and a method for assembling rotor blades of such a turbine.

PRIOR ART

An aircraft turbomachine generally comprises, from upstream to downstream in the direction of flow of the gases, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

In a known manner, the low-pressure turbine rotor blades have a dovetail base, for example, and are fixed in the cavities of a rotor disk, the cavities being generally machined by broaching. The connection between the blades and the disk thus works in traction during the operation of the turbine, due to centrifugal forces.

In order to improve the engine efficiency, the aircraft turbomachines can be equipped with a counter-rotating turbine, instead of the low-pressure turbine. The counter-rotating turbine comprises an inner rotor, called fast rotor, connected to a first turbine shaft, and configured to rotate in a first direction of rotation, and an outer rotor, called slow rotor, connected to a second turbine shaft, and configured to rotate in a second direction of rotation, opposite to the first direction of rotation. The blades of the first rotor are interposed with the blades of the second rotor.

The architecture of the outer rotor of the counter-rotating turbine differs from that of conventional turbine rotors, in that the blades of the outer rotor are not fixed on a disk, but are fixed on an outer rotor casing, or outer drum, and extend from their fixing point on the outer rotor casing, inwardly of the turbine. Consequently, the connection between the blades and the outer rotor casing thus works in compression during the operation of the turbine, due to centrifugal forces. The connections mentioned above, generally used on the simple low-pressure turbines, that is to say not counter-rotating, do not have sufficient rigidity, and are no longer suitable for the architectures working in compression, in particular on the outer rotors of counter-rotating turbines. Indeed, oscillating movements of the blade relative to the radial direction, or rotational movements about this axis, can occur when the attachment between the blade and the casing works in compression.

There is therefore a need to overcome the drawbacks mentioned above.

DISCLOSURE OF THE INVENTION

The present disclosure relates to a counter-rotating turbine of a turbomachine, extending about an axis and comprising:

an inner rotor configured to rotate about the axis of rotation, and comprising an inner drum on which is fixed an inner movable blading having at least one inner movable blade extending radially outwardly, an outer rotor configured to rotate about the axis of rotation in a direction opposite to the inner rotor, and comprising an outer drum on which is fixed an outer movable blading having at least one outer movable blade extending radially inwardly, the outer movable blading comprising at least one fixing rod extending through an orifice of the outer drum, the outer movable blading being fixed to the outer drum via a clamping means fixed to the fixing rod from an outer face of the outer drum, a set ring being disposed around the fixing rod in the orifice of the outer drum.

In the present disclosure, the outer movable blading can be a single outer movable blade or a sector comprising several blades. The remainder of the description refers to an outer movable blade. The terms "inner" and "outer", and the terms "internal" and "external" and their derivatives are considered along the radial direction of the turbine. For example, the term "outwardly" defines a direction from the center of the turbine outwardly of the turbine in the radial direction. Consequently, the inner movable blades comprise a root fixed to the inner drum, and extend from that root, outwardly, up to a free end opposite to the end fixed to the inner drum.

Likewise, the outer movable blades comprise a root, or a base fixed to the outer drum, and extend from that base, inwardly, up to a free end opposite to the end fixed to the outer drum.

The outer drum is thus disposed around the inner drum, and rotates in a direction opposite to the inner drum. During the operation of the turbine, when the outer drum rotates at high speed, the centrifugal forces tend to crush the outer movable blades against the outer drum, on which they are fixed. The attachment between the outer movable blades and said outer drum therefore works in compression.

The outer movable blade is fixed to the outer movable drum by passing the fixing rod through an orifice of said drum, and by clamping the whole through the clamping means fixed to the fixing rod on the outer side of the outer drum, thus pressing the outer movable blade against the inner face of said drum.

This fixing mode has the advantage of improving the rigidity of the fixing of the blade on the outer drum compared to the known fixing of the blades, for example with a dovetail root inserted into a cavity of a disk. The fixing mode of the present disclosure allows in particular limiting the oscillating movements of the blade relative to the radial direction, or the rotational movements about this axis, when the attachment between the blade and the drum works in compression. It is thus possible to increase the frequency of the eigenmodes of the blades or blade sectors and thus avoid the vibration ranges of the engine in operation.

In addition, the presence of the set ring allows improving the setting, in other words the holding of the fixing rod in the orifice of the outer movable drum. The ring thus allows, for example by filling an existing clearance between the rod and the inner wall of the orifice, further improving the overall rigidity of the fixing of the movable blade on the outer drum, working in compression. Furthermore, the fixing rod and the outer drum can be made of metal. The ring therefore also allows limiting the metal transfers between the fixing rod and the outer drum, thus limiting the fretting wear between these two elements.

In some embodiments, the set ring extends along the fixing rod inside the orifice of the drum, between a base of the outer movable blade and the clamping means.

In some embodiments, the set ring extends along the fixing rod on at least one third of the length of the fixing rod, preferably at least half of said length.

The ring may thus have the shape of a cylinder disposed around the fixing rod, and extending over at least one third, preferably at least half of the length of the fixing rod. This allows optimizing the setting of the outer movable blade, and thus improving the rigidity of the fixing of the rod to the outer drum.

In some embodiments, the turbine comprises a sealing ring fixed on an inner face of the outer drum, the sealing ring comprising at least one anti-rotation stud, the anti-rotation stud being engaged in a notch of the outer movable blading.

The sealing ring preferably has an annular or frustoconical shape, similar to the shape of the outer drum, and is fixed inside said outer drum, on an inner face thereof.

In some embodiments, the at least one anti-rotation stud is disposed at the same circumferential position as the orifice of the casing.

It is understood by "circumferential position", the position of the stud about the axis of rotation of the turbomachine at a given position along said axis. Consequently, it is understood by "disposed at the same circumferential position as the orifice of the outer drum", that the stud and the central axis of the orifice are disposed in the same plane, said plane being parallel to the axis of the turbomachine and comprising this axis. In other words, a median plane of the stud parallel to the axis of the turbomachine comprises the central axis of the orifice.

Consequently, when the outer movable blade is fixed to the outer drum by passing the fixing rod in the orifice of the outer drum, the anti-rotation stud can be engaged in the notch of the blade. The movements of the blade about its main axis, that is to say about a radial axis, are thus limited. In addition, the rotational movements of the sealing ring can also be limited.

In some embodiments, a junction strip comprising at least one orifice coaxial with the orifice of the outer drum is interposed between the inner face of the outer drum and the outer movable blading.

In other words, the fixing rod is engaged both in the orifice of the strip and in the orifice of the outer drum, the strip then being sandwiched between the blade and the outer drum. The junction strip allows limiting the metal transfers between the blade and the drum, causing fretting wear between these two parts. The strip thus allows limiting the wear of these parts, and increasing their lifespan. Preferably, the junction strip comprises a plurality of orifices, each orifice being coaxial with an orifice of the drum.

In some embodiments, the fixing rod extends radially from the base and the base comprises the notch.

The fixing rod and the blade, in particular the base, can be a single piece, for example by being made from the same metal casting.

In some embodiments, the turbine comprises a damping means configured to be inserted into a recess formed between the bases of two adjacent blades.

The base may for example comprise two parallel side walls spaced apart from each other, one end of the two walls forming the notch. A recess is formed between two side walls of the bases of the two adjacent blades. The fixing rod extends radially outside the base. The damping means can then be disposed in the recess, by inserting it into this recess. The damper can be a piece of bent or stamped sheet metal, or a 3D printed part, for example. It can be disposed in the recess between the two side walls of one or more blades and allows the sealing between the two side walls and also allows, by friction and deformation, damping the movements of these two walls.

The present disclosure also relates to a turbomachine comprising the counter-rotating turbine according to any one of the preceding embodiments.

The present disclosure also relates to a method for assembling an outer movable blading of a counter-rotating turbine according to any one of the preceding embodiments, comprising:

insertion of a fixing rod of the outer movable blading in an orifice of the outer drum of the outer rotor of the turbine, insertion of the set ring around the fixing rod, in the orifice, fixing of the outer movable blading to the outer drum via a clamping means fixed to the fixing rod from an outer face of the outer drum.

In some embodiments, prior to the step of inserting the fixing rod, a sealing ring, comprising at least one anti-rotation stud, is fixed on an inner face of the outer drum, such that the stud is disposed at the same circumferential position as an orifice of the drum, the anti-rotation stud being engaged in a notch of the outer movable blade during the step of inserting the fixing rod into the orifice of said outer drum.

In some embodiments, prior to the step of fixing the fixing means on the rod, a sealing washer is installed so as to be interposed between the set ring and the fixing means

BRIEF DESCRIPTION OF THE DRAWINGS

The invention and its advantages will be better understood upon reading the detailed description given below of different embodiments of the invention given by way of non-limiting examples. This description refers to the pages of appended figures, on which:

FIG. 1 represents a general view illustrating the operating principle of a turbomachine with counter-rotating fans, FIG. 2 represents an exploded perspective view of an attachment between an outer movable blade and a movable outer rotor drum of a counter-rotating turbine according to a first embodiment, FIG. 3 represents a perspective view of a first step of a method for assembling an outer movable blade of a counter-rotating turbine, FIG. 4 represents a perspective view of a second step of a method for assembling an outer movable blade of a counter-rotating turbine, FIGS. 5A, 5B and 5C represent perspective views of a third step of a method for assembling an outer movable blade of a counter-rotating turbine, FIGS. 6A and 6B represent perspective views of a fourth step of a method for assembling an outer movable blade of a counter-rotating turbine, FIGS. 7A and 7B represent perspective views of a fifth step of a method for assembling an outer movable blade of a counter-rotating turbine, FIGS. 8A and 8B represent perspective views of a sixth step of a method for assembling an outer movable blade of a counter-rotating turbine, FIG. 9 represents a perspective view of the attachment of FIG. 2 according to a modified example of the first embodiment, FIGS. 10A and 10B represent a perspective view of a sector of outer movable blades of a counter-rotating turbine according to a second embodiment, FIG. 11 schematically represents the steps of an assembly method according to the present disclosure.

DESCRIPTION OF THE EMBODIMENTS

Referring to FIG. 1, a turbomachine 10 with counter-rotating fans includes a longitudinal axis X-X. From upstream to downstream along the direction of flow of the gases in the turbomachine (represented by the black arrow), the turbomachine 10 essentially comprises three parts: an upstream module A (or fan section), an intermediate module B (or high-pressure body) and a downstream module C (or low-pressure turbine section).

The three parts A, B and C of the turbomachine are modular, that is to say they each form a single assembly and can each be replaced by being separated from the other parts of the turbomachine.

In a manner well known per se, the high-pressure body B comprises a gas generator for producing combustion gases. This gas generator comprises a compressor 12, a combustion chamber 14 and a high-pressure turbine 16.

The air compressed by the compressor 12 is mixed with the fuel in the combustion chamber 14 before being burned therein. The thus produced combustion gases drive the movable blades of the high-pressure turbine 16 which itself drives the compressor 12 via a high-pressure shaft 18. The circulation of the combustion gases in the turbomachine 10 takes place axially from upstream to downstream.

The low-pressure turbine section C comprises a first annular rotor, or outer rotor. This first rotor comprises a row of outer movable blades 20 of the turbine which extend radially inwardly and which are axially spaced apart from each other.

The low-pressure turbine section C also comprises a second annular rotor or inner rotor. This second rotor comprises a row of inner movable blades 22 of the turbine which extend radially outwardly and which are axially spaced apart from each other. The turbine blades 20, 22 of the first and second rotors are disposed alternately relative to each other such that the first and second rotors are nested within each other.

The movable turbine blades 20 of the first rotor are rotatably supported by a first low-pressure shaft 24. Likewise, the movable turbine blades 22 of the second rotor are rotatably supported by a second low-pressure shaft. 26 disposed coaxially about the first shaft 24. The low-pressure shafts 24, 26 extend axially from upstream to downstream of the turbomachine.

The combustion gases coming from the high-pressure body B pass through the low-pressure turbine section C. These combustion gases therefore rotatably drive the turbine blades 20, 22 of the first and second rotors in opposite directions. Thus, the first and second low-pressure shafts 24, 26 also rotate in a counter-rotating manner.

The fan section A is located upstream of the turbomachine 10. A cowl 28 annularly surrounds this fan section A. The cowl 28 is supported by spacers 30 which extend radially inwardly of the turbomachine.

The fan section A includes a first row of fan blades 32 mounted on an upstream fan shaft 34 which is connected to an upstream end of the first low-pressure shaft 24.

The fan section A also includes a second row of fan blades 36 which are axially spaced apart downstream of the first row of fan blades 32 and mounted on a rear fan shaft 38 connected to one upstream end of the second low-pressure shaft 26.

The first and second rows of fan blades 32, 36 thus rotate in opposite directions which are represented, by way of example, by the respective arrows F1 and F2. This configuration with counter-rotating fans thus gives the turbomachine high efficiency for a relatively low specific consumption.

The fan blades 32, 36 extend radially from the upstream 34 and downstream 38 fan shafts practically to the cowl 28. They are disposed in the air circulation passage supplying both the primary flowpath 40 leading to the compressor 12 of the high-pressure body B and the secondary bypass flowpath 42.

At its upstream end, the first low-pressure shaft 24 rotatably supports the second low-pressure shaft 26 via a first rolling bearing 44 and a second rolling bearing 46 disposed downstream of the first rolling bearing.

The first rolling bearing 44 is of the ball type to withstand the axial loads, while the second rolling bearing 46 is of the roller type to withstand the radial loads of the turbomachine.

The inner movable blades 22 comprise a root fixed to a disk, and extend radially outwardly from that root to a radially outer end. Thus, when the second rotor rotates around the shaft 26, the blades 22 exert an outwardly directed force on the attachment between the disk and the root, due to centrifugal forces. The attachment between the disk and the root of the blades 22 is therefore subjected to tensile stresses.

The outer movable blades 20 comprise an outer portion fixed to an outer drum 50, and extend radially inwardly from this base to a radially inner end. Thus, when the first rotor rotates around the shaft 24, the blades 20 exert an outwardly directed force on the attachment between the drum 50 and the base of the blade 20, due to the centrifugal forces. The attachment between the drum 50 and the base of the blades 20 is therefore subjected to compressive stresses.

The remainder of the description describes a mode for fixing and a method for fixing outer movable blades 20, with reference to the low-pressure turbine C of the turbomachine 10. However, this fixing mode is not limited to this low-pressure turbine, and can be adapted to other elements of the turbomachine, for example the high-pressure turbine.

FIG. 2 represents an exploded perspective view of an attachment between an outer movable blade 20 and the movable outer rotor drum 50 of the counter-rotating turbine, and FIG. 8B represents the attachment of FIG. 2 when the movable blade 20 and the movable drum 50 are assembled and fixed together.

Furthermore, the terms "inner" or "outer" and their derivatives refer to the radial direction of the turbine.

The outer drum 50 comprises a plurality of orifices 51, or through holes, evenly distributed circumferentially about the axis X-X, each orifice 51 corresponding to a movable blade 20.

A sealing ring 60 is fixed on an inner face of the drum 50, and ensures the sealing between the upstream and downstream part of the inner movable wheel of the turbine. Different fixing modes can be envisaged to fix the ring on the inner face of the outer drum. The positioning of the anti-rotation stud in the notch of the blade can in particular allow retaining the rotation of the sealing ring. The sealing ring may comprise an outer part fixed to the drum, and an inner part ensuring the sealing. The inner part may be an abradable part, comprising a heat-resistant metal material, and in the shape of a honeycomb, for example. An axial end 61, along the axis X-X, of the ring 60 is disposed in the vicinity, for example by about 1 cm, of the orifices 51 of the drum 50 (see FIG. 4). The sealing ring 60 may be annular or comprise a plurality of ring sectors disposed circumferentially end-to-end. The sealing ring 60 comprises a plurality of protrusions 62, for example tenons, or parallelepiped shaped positioning studs, extending axially, along the axis X-X, from the axial end 61 of the sealing ring 60, and distributed circumferentially, preferably evenly about the axis X-X. Preferably, the sealing ring 60 can comprise as many positioning studs 62 as the drum 50 does not comprise orifices 51. In addition, each anti-rotation stud 62 may be disposed, for example, at the same position, along the circumferential direction, as an orifice 51 of the drum 50.

The movable blade 20 (only one is represented) comprises an inner portion 20a which is disposed in the primary flowpath 40, and an outer portion, or fixing portion, which is disposed outside said flowpath. The outer and inner portions are separated by a platform 20b, delimiting the air flowpath. The outer portion or fixing portion comprises a preferably hollow base 210 or root having a groove 211, or notch, on one face of the base 210.

A fixing rod 212 extends from the base 210, more specifically from an outer wall of the base 210, in the radial direction, that is to say along the length of the blade 20. This rod 212 comprises a thread on at least a portion 212a thereof, a portion 212b of the rod then not comprising a thread. The rod 212 is configured, during the fixing of the blade 20 to the drum 50, to pass through an orifice 51 of the drum 50, and is long enough to pass completely through this orifice, such that the threaded portion 212a comes out from the opposite side of the orifice 51, on the outer face of the drum 50.

In this case, the outer wall of the base 210 abuts against the inner face of the drum 50. In this position, the anti-rotation stud 62 is positioned in the groove 211 of the base 210. The anti-rotation stud 62 thus positioned in the groove 211 allows angularly setting the blade 20 and blocking the rotations thereof about its axis.

A foil 70, in the form of a thin annular metal strip and having a plurality of orifices 72 each disposed coaxially in line with an orifice 51 of the drum 50, is disposed against and sandwiched between the outer portion of the base 210 and the inner face of the drum 50, when the blade 20 is fixed and clamped to the movable drum 50. The foil 70 includes an alloy which can withstand heat, for example Inconel® or Waspaloy®. The foil 70 may be formed of a single piece in contact with the inner face of the drum 50 over its entire circumference, or comprise several sectors. The foil 70 prevents metal transfers causing fretting wear between these two parts.

A ring 80 is disposed around the rod 212 and in the orifice 51 of the drum 50. More specifically, the ring 80 may include an outer portion in the form of a flange 82 bearing on the outer face of the movable drum 50, and an inner portion in the form of a cylinder 81 extending inside an orifice 51 of the drum 50 over at least a portion of the length of the fixing rod 212, for example one third of the length of said rod. The ring may be made of metal, and may include in particular an alloy capable of withstanding heat, for example Inconel® or Waspaloy®. The ring 80, more specifically the inner part 81, allows filling the annular space S existing between the fixing rod 212 and the inner face of the orifice 51 of the drum 50. In the same way as the foil 70, the ring 80 allows limiting the transfers of metal between the fixing rod 212 and the drum 50, thus limiting the fretting wear between these two elements. The ring 80 further contributes to improving the setting of the blade 20 when the latter is fixed to the drum 50, and also improving the rigidity of the assembly.

The threaded portion 212a of the fixing rod 212 then protrudes outside the movable drum 50, out of the orifice 51 of the drum 50. A nut 100 is screwed onto the threaded portion 212a of the fixing rod 212, from the outer face of the drum 50, and allows clamping the movable blade 20, particularly the outer wall of the base 210 of the blade, against the inner face of the drum 50. A washer 90 can further be disposed and clamped between the nut 100 and the flange 82 of the ring 80, allowing in particular preventing damage to the ring 80 when the nut 100 is clamped on the rod 212. It further allows improving the sealing between the ring 80 and the nut 100.

As illustrated in FIG. 9, a damper 110 may be disposed inside a recess formed between the side walls of the bases 210 of two blades 20 (only one being represented in FIG. 9).

The remainder of the description presents a method for assembling an outer movable blade 20 of a counter-rotating turbine, with reference to FIGS. 3 to 8B, and 11.

The sealing ring 60 is first fixed on the inner face of the outer rotor drum 50, for example such that a mid plane P of each anti-rotation stud 62 is aligned with the axis of an orifice 51 of the drum (step S1). The median plane P of a stud 62 is a plane defined by the axial direction and a radial direction of the turbine, and passing through a center of said stud 62.

The foil 70 is then disposed against the inner face of the outer rotor drum 50, such that each orifice 72 of the foil 70 is coaxially disposed in line with an orifice 51 of the drum (step S2). The foil 70 can be slid axially in a gap between the positioning studs 62 and the inner face of the rotor 50.

A movable blade 20 is then disposed on the drum 50, by inserting the fixing rod 212 into an orifice 51 of the drum 50, while orienting the blade 20 such that the anti-rotation stud 62 of the sealing ring 60 is inserted into the notch 211 formed in the base 210 of the blade (step S3). In this position, a threaded portion 212a of the fixing rod 212 protrudes from the orifice 51 of the drum 50, from the outer face of said drum 50.

The ring 80 is disposed around the threaded portion 212a of the fixing rod 212 from the outside of the drum 50, and disposed inside the orifice 51 of the drum 50, until the flange 82 of the ring abuts against the outer face of the drum (step S4). Alternatively, the ring 80 can be disposed inside the orifice 51, before the insertion of the fixing rod 212 into the orifice 51. In other words, step S4 can be carried out before step S3.

The washer 90 can also be disposed around the threaded portion 212a of the fixing rod 212 and on the flange 82 of the ring 80, from the outside of the drum (step S5). It is noted that the presence of a washer, and therefore step S5, is not mandatory. The nut 100 is then screwed on the threaded portion 212a of the fixing rod 212 up to the washer 90, so as to fix the assembly, and particularly clamp the movable blade 20 against the inner face of the drum (step S6), the foil 70 then being sandwiched between the blade 20 and said inner face of the drum 50.

Steps S3 to S6 described above are repeated for all the blades 20 of the outer rotor.

According to another embodiment of the present disclosure, presented with reference to FIG. 10, the attachment device and the fixing method described above apply not to a movable blade of the outer rotor, but to a sector 300 of movable blades. Particularly, a single fixing rod 212, or more, can be provided on a sector 300 of blades comprising a plurality of blades 20, for example six blades 20. The characteristics of the device and of the fixing method described above however remain the same in this case. Particularly, the fixing rod(s) 212 of the blade sector 300 is inserted into an orifice 51 of the outer rotor drum 50, and the attachment device also comprises a foil 70, a ring 80, a washer 90 and a nut 100. The fact of having a fixing rod 212 for several blades allows simplifying the mounting process, and optimizing the mounting time, the number of iterations of steps S3 and S6 being smaller than in the first embodiment. This embodiment also allows limiting the number of fixing parts such as rods or nuts, thus allowing saving mass, and also allows obtaining blade sectors that are stiffer than unit blades.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

It is also obvious that all the characteristics described with reference to one method are transposable, alone or in combination, to one device, and conversely, all the characteristics described with reference to one device are transposable, alone or in combination, to one method.

The invention claimed is:

1. A counter-rotating turbine of a turbomachine, extending about an axis and comprising:
    an inner rotor configured to rotate about the axis of rotation, and comprising an inner drum on which is fixed an inner movable blading having at least one inner movable blade extending radially outwardly,
    an outer rotor configured to rotate about the axis of rotation in a direction opposite to the inner rotor, and comprising an outer drum on which is fixed an outer movable blading having at least one outer movable blade extending radially inwardly,
    the outer movable blading comprising at least one fixing rod extending through an orifice of the outer drum, the outer movable blading being fixed to the outer drum via a nut fixed to the fixing rod from an outer face of the outer drum, a set ring being disposed around the fixing rod in the orifice of the outer drum, wherein the turbine comprises a sealing ring fixed on an inner face of the outer drum, the sealing ring comprising at least one anti-rotation stud, the anti-rotation stud being engaged in a notch of a base of the outer movable blading.

2. The turbine according to claim 1, wherein the set ring extends along the fixing rod inside the orifice of the outer drum, between the base of the outer movable blading and the nut, on at least one third of the length of the fixing rod.

3. The turbine according to claim 1, wherein a junction strip comprising at least one orifice coaxial with the orifice of the outer drum is interposed between the inner face of the outer drum and the outer movable blading.

4. The turbine according to claim 1, wherein the fixing rod extends radially from the base, the base comprising the notch.

5. The turbine according to claim 1, comprising a damper configured to be inserted into a recess formed between bases of two adjacent outer movable bladings.

6. A turbomachine comprising the counter-rotating turbine according to claim 1.

7. A method for assembling an outer movable blading of a counter-rotating turbine according to claim 1, comprising:
    insertion of a fixing rod of the outer movable blading in an orifice of the outer drum of the outer rotor of the turbine,
    insertion of the set ring around the fixing rod, in the orifice,
    fixing of the outer movable blading to the outer drum via a nut to the fixing rod from an outer face of the outer drum, wherein, prior to the step of inserting the fixing rod, a sealing ring, comprising at least one anti-rotation stud, is fixed on an inner face of the outer drum, the anti-rotation stud being engaged in a notch of a base of the outer movable blading during the step of inserting the fixing rod in the orifice of said outer drum.

8. The method according to claim 7, wherein, prior to the step of fixing the nut on the fixing rod, a sealing washer is installed so as to be interposed between the set ring and the nut.

9. The turbine according to claim 1, wherein the set ring extends along the fixing rod inside the orifice of the outer drum, between a base of the outer movable blading and the nut, on at least half of the length of the fixing rod.

* * * * *